United States Patent
Okano et al.

(10) Patent No.: US 10,957,916 B2
(45) Date of Patent: Mar. 23, 2021

(54) POROUS CARBON SHEET AND PRECURSOR FIBER SHEET THEREOF

(71) Applicant: Toray Industries, Inc., Tokyo (JP)

(72) Inventors: Yasutaka Okano, Otsu (JP); Takayuki Oda, Otsu (JP); Takashi Chida, Otsu (JP)

(73) Assignee: Toray Industries, Inc., Tokyo (JP)

( * ) Notice: Subject to any disclaimer, the term of this patent is extended or adjusted under 35 U.S.C. 154(b) by 7 days.

(21) Appl. No.: 15/544,455

(22) PCT Filed: Jan. 19, 2016

(86) PCT No.: PCT/JP2016/051391
§ 371 (c)(1),
(2) Date: Jul. 18, 2017

(87) PCT Pub. No.: WO2016/121569
PCT Pub. Date: Aug. 4, 2016

(65) Prior Publication Data
US 2017/0373325 A1 Dec. 28, 2017

(30) Foreign Application Priority Data
Jan. 28, 2015 (JP) .............................. JP2015-014204

(51) Int. Cl.
*H01M 4/96* (2006.01)
*H01M 4/88* (2006.01)
(Continued)

(52) U.S. Cl.
CPC ............... *H01M 4/96* (2013.01); *C01B 32/05* (2017.08); *D01F 9/22* (2013.01); *D03D 1/00* (2013.01);
(Continued)

(58) Field of Classification Search
CPC ............ H01M 4/96; H01M 4/88; H01M 8/10; H01M 8/0234; H01M 2008/1095;
(Continued)

(56) References Cited

U.S. PATENT DOCUMENTS

| 3,835,006 A * | 9/1974 | Hideo et al. ............. | D21C 9/08 |
| | | | 162/50 |
| 2006/0180798 A1* | 8/2006 | Chida .................... | D21H 13/50 |
| | | | 428/408 |

FOREIGN PATENT DOCUMENTS

| JP | 52-119477 A | 10/1977 |
| JP | 02-47347 | 2/1990 |

(Continued)

OTHER PUBLICATIONS

[NPL-1] Senda et al. (JP 2011-195374 A); Oct. 6, 2011 [JPP machine translation to English]. (Year: 2011).*

(Continued)

*Primary Examiner* — David Sample
*Assistant Examiner* — Donald M Flores, Jr.
(74) *Attorney, Agent, or Firm* — DLA Piper LLP (US)

(57) ABSTRACT

A precursor fiber sheet includes short carbon fibers having an average length of 3 to 10 mm, natural pulp having an ash content of 0.15 mass % or less, and a heat-carbonizable resin, and a porous carbon sheet is obtained by carbonizing the precursor fiber sheet. This enhances gas diffusibility and water removal properties of the porous carbon sheet and has high mechanical strength and few appearance defects even when the bulk density of the porous carbon sheet is lowered.

5 Claims, 2 Drawing Sheets

(51) Int. Cl.
  *D04H 1/587* (2012.01)
  *D04H 1/4242* (2012.01)
  *D03D 15/00* (2006.01)
  *D03D 13/00* (2006.01)
  *D03D 1/00* (2006.01)
  *H01M 8/10* (2016.01)
  *D01F 9/22* (2006.01)
  *C01B 32/05* (2017.01)

(52) U.S. Cl.
  CPC ............ *D03D 13/008* (2013.01); *D03D 15/00* (2013.01); *D04H 1/4242* (2013.01); *D04H 1/587* (2013.01); *H01M 4/88* (2013.01); *H01M 8/10* (2013.01); *Y02E 60/50* (2013.01); *Y02P 70/50* (2015.11); *Y10T 428/26* (2015.01)

(58) Field of Classification Search
  CPC ........ D03D 15/00; D03D 1/00; D03D 13/008; D01F 9/22; D04H 1/4242; D04H 1/587; Y10T 428/26; C01B 32/05; Y02E 60/523; Y02P 70/56
  See application file for complete search history.

(56) References Cited

FOREIGN PATENT DOCUMENTS

| | | | |
|---|---|---|---|
| JP | 02047347 A | * | 2/1990 |
| JP | 6-60884 A | | 3/1994 |
| JP | 2000-136493 A | | 5/2000 |
| JP | 2005-183325 A | | 7/2005 |
| JP | 2007-165120 A | | 6/2007 |
| JP | 2008-311181 | | 12/2008 |
| JP | 2010-192379 A | | 9/2010 |
| JP | 2011-195374 A | | 10/2011 |
| JP | 2011195374 A | * | 10/2011 |

OTHER PUBLICATIONS

[NPL-2] Morimoto (JP H02-047347-A); Feb. 16, 1990 [EPO machine translation to English]. (Year: 1990).*

[NPL-3] Strunk, Peter; "Characterization of cellulose pulps and the influence of their properties on the process and production of viscose and cellulose ethers". 2012; Department of Chemistry, Umeå University, Sweden. (Year: 2012).*

Supplementary European Search Report dated Jul. 6, 2018, of corresponding European Application No. 16743173.3.

* cited by examiner

POROUS CARBON SHEET AND PRECURSOR FIBER SHEET THEREOF

TECHNICAL FIELD

This disclosure relates to a porous carbon sheet suitably used for a fuel cell, particularly a polymer electrolyte fuel cell, and a precursor fiber sheet thereof. More specifically, this disclosure relates to a porous carbon sheet having few appearance defects and excellent mechanical strength, and further having high gas diffusibility in the thickness direction and high water removal properties to enhance power generation performance, and a precursor fiber sheet thereof.

BACKGROUND

In a polymer electrolyte fuel cell, a fuel gas containing hydrogen is supplied to an anode and an oxidizing gas containing oxygen is supplied to a cathode to produce an electromotive force by an electrochemical reaction occurring at both the electrodes. A porous carbon sheet used as a gas diffusion layer of a polymer electrolyte fuel cell is required to have high gas diffusibility to diffuse a gas supplied from a separator to a catalyst layer, high water removal properties to remove water generated by an electrochemical reaction to the separator, and high electrical conductivity to extract the generated current. A porous carbon sheet made of a carbon fiber is widely used.

To enhance power generation performance of a fuel cell in a wide range of environmental conditions, gas diffusibility in the thickness direction and water removal properties of the porous carbon sheet should be improved. For this improvement, a method of lowering the bulk density of the porous carbon sheet has been proposed (Japanese Patent Laid-open Publication No. 2010-192379). However, such a porous carbon sheet has a low mechanical strength because it has a low rate of bonding carbide, and also has a problem in structure feasibility, durability, and productivity.

Besides, to improve mechanical strength and electrical conductivity, there is also disclosed a porous electrode substrate that includes a precursor fiber sheet mixed with fibrillated synthetic pulp or natural pulp (Japanese Patent Laid-open Publication No. 2000-136493 and Japanese Patent Laid-open Publication No. 2011-195374).

However, use of fibrillated synthetic pulp may unfavorably inhibit mass transfer inside the fuel cell. In contrast, use of not so fibrillated natural pulp prevents inhibition of mass transfer inside the fuel cell to some extent. However, use of generally used natural pulp may cause a large number of appearance defects of unknown cause such as holes and foreign matter, in the porous carbon sheet, and thus may cause reduction in yield and reduction in production efficiency due to an increase in the inspection man-hours in the production of a porous carbon sheet.

It could therefore be helpful to enhance gas diffusibility and water removal properties of a porous carbon sheet by providing a porous carbon sheet having high mechanical strength and few appearance defects even when the bulk density of the porous carbon sheet is lowered, and a precursor fiber sheet to obtain the porous carbon sheet.

SUMMARY

We thus provide a precursor fiber sheet including short carbon fibers having an average length of 3 to 10 mm, natural pulp having an ash content of 0.15 mass % or less, and a heat-carbonizable resin.

Further, the porous carbon sheet has the following structure. That is, the porous carbon sheet is obtained by carbonizing the above-mentioned precursor fiber sheet.

Further, we provide a method including heating the above-mentioned precursor fiber sheet at a temperature within a range having a maximum temperature of 1300 to 3000° C. to convert the natural pulp and the heat-carbonizable resin into a bonding carbide.

It is thus possible to provide a gas diffusion layer having few appearance defects and excellent mechanical strength, and further having enhanced gas diffusibility in the thickness direction and enhanced water removal properties to enhance power generation performance.

DESCRIPTION OF REFERENCE SIGNS

1: Porous carbon sheet
2: Short carbon fiber
3: Pulp carbide
4: Resin carbide
5: Microporous layer
6: Catalyst layer
7: Electrolyte membrane
8: Carbonaceous particles and water-repellent resin
9: Void

DETAILED DESCRIPTION

The porous carbon sheet will be described with reference to the drawings. It should be noted that our sheets, precursor sheets and methods are not limited to the structures and steps shown in the drawings.

Figure 1:
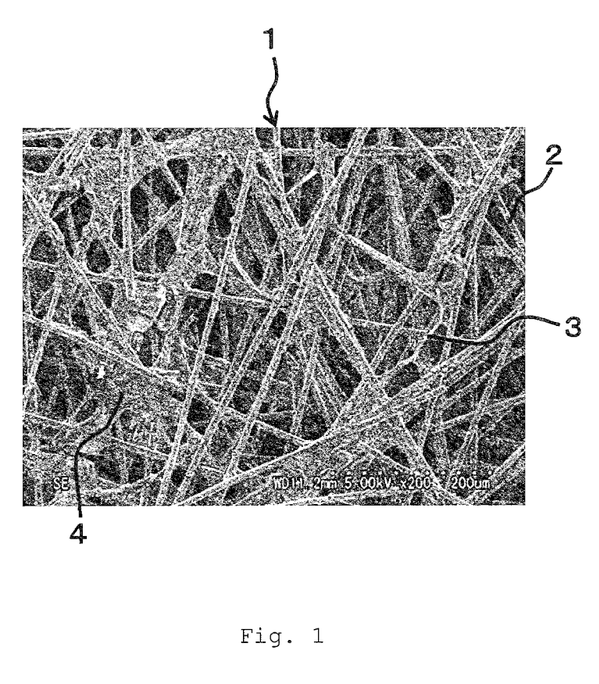
FIG. 1 is an electron microscope photograph (magnification: 200-fold) obtained by imaging a surface of a porous carbon sheet according to an example.

FIG. 1 is an electron microscope photograph (magnification: 200-fold) obtained by imaging a surface of a porous carbon sheet according to an example. A porous carbon sheet 1 is formed of short carbon fibers 2 and a pulp carbide 3 bonded to each other by a resin carbide 4.

Figure 2:
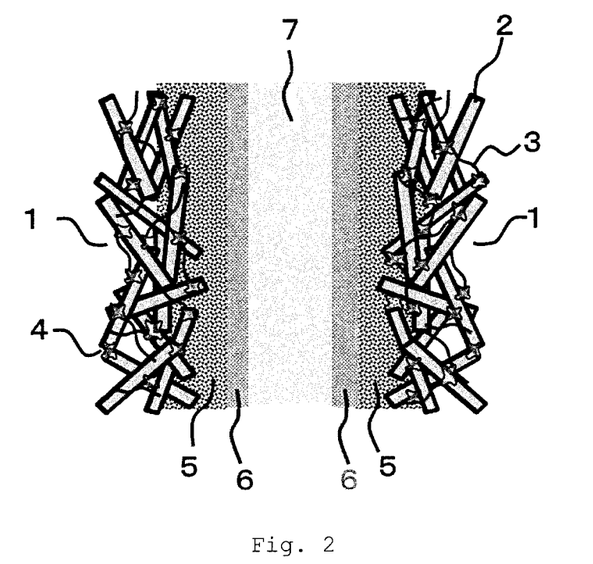
FIG. 2 is a schematic sectional view of a membrane electrode assembly including a porous carbon sheet according to an example.

FIG. 2 is a schematic sectional view of a membrane electrode assembly including a porous carbon sheet according to an example. A porous carbon sheet 1 is formed of short carbon fibers 2 and a pulp carbide 3 bonded to each other by a resin carbide 4. In FIG. 2, the porous carbon sheet 1 has a microporous layer 5 containing carbonaceous particles on the catalyst layer side. The constituent elements will be described in the following.

The porous carbon sheet is required to have high gas diffusibility to diffuse a gas supplied from a separator to a catalyst layer, high water removal properties to remove water generated by an electrochemical reaction to the separator, and high electrical conductivity to extract the generated current. Therefore, the porous carbon sheet has electrical conductivity and, preferably, has an average pore size of 10 to 100 μm.

More specifically, as the porous carbon sheet, for example, a carbon fiber woven fabric, or a carbon fiber nonwoven fabric such as a carbon fiber paper sheet may be used as it is. In view of being excellent in the property of absorbing dimensional change of the electrolyte membrane in the thickness direction, that is, "spring property", a substrate obtained by bonding short carbon fibers included in the carbon fiber paper sheet with a carbide, that is, "carbon paper", is used in the carbon fiber paper sheet. Carbon paper is a product obtained by incorporating a heat-carbonizable resin (hereinafter also referred to as easily carbonizable resin) into a carbon fiber paper sheet to produce a precursor fiber sheet, and then converting the easily carbonizable resin into a carbide by carbonization.

The precursor fiber sheet is a precursor of the porous carbon sheet. The precursor fiber sheet includes short carbon fibers having an average length of 3 to 10 mm, natural pulp having an ash content of 0.15 mass % or less, and a heat-carbonizable resin. The porous carbon sheet is obtained by carbonizing the precursor fiber sheet.

Short carbon fibers are carbon fibers in a discontinuous (short fiber) state. Examples of the carbon fibers include polyacrylonitrile (hereinafter abbreviated as PAN)-based, pitch-based, rayon-based and vapor grown carbon fibers. Among them, a PAN-based or pitch-based carbon fiber is preferably used because of excellent mechanical strength.

In the precursor fiber sheet, the short carbon fibers preferably have an average monofilament diameter of 3 to 20 µm, more preferably 5 to 10 µm. When the average diameter is 3 µm or more, the obtained porous carbon sheet has a large pore size and improved water removal properties, and is prevented from flooding. On the other hand, when the average diameter is 20 µm or less, the obtained porous carbon sheet is reduced in water vapor diffusibility, and is prevented from dry-out. Further, it is preferable to use two or more kinds of short carbon fibers having different average diameters since the surface smoothness of the obtained porous carbon sheet can be improved.

Herein, the average monofilament diameter of short carbon fibers is determined as follows: a photograph of the carbon fibers is taken under a microscope such as a scanning electron microscope at a magnification of 1,000-fold or greater, 30 different monofilaments are randomly selected, diameters of the monofilaments are measured, and then the average of the diameters is calculated. As the scanning electron microscope, S-4800 manufactured by Hitachi, Ltd. or a similar product can be used.

Carbon fibers used in the precursor fiber sheet are discontinuous, that is, short carbon fibers. Specifically, to ensure dispersibility of short carbon fibers during mixing with natural pulp described later, the average length of short carbon fibers should be 3 to 10 mm. The length is especially preferably 4 to 9 mm. When the average length is 3 mm or more, the obtained porous carbon sheet is excellent in mechanical strength and electrical conductivity. On the other hand, when the average length is 10 mm or less, the short carbon fibers are excellent in dispersibility at the time of mixing with natural pulp described later, and the number of appearance defects due to short carbon fiber bundles per a unit area of 1 m$^2$ as described later can be suppressed to 1 or less. The short carbon fibers having such an average length can be obtained by, for example, a method of cutting a continuous carbon fiber into a desired length.

Herein, the average length of short carbon fibers is determined as follows: a photograph of the short carbon fibers is taken under a microscope such as a scanning electron microscope at a magnification of 50-fold or greater, 30 different monofilaments are randomly selected, lengths of the monofilaments are measured, and then the average of the lengths is calculated. As the scanning electron microscope, S-4800 manufactured by Hitachi, Ltd. or a similar product can be used. The average diameter and the average length of monofilaments in short carbon fibers are usually measured by directly observing the short carbon fibers as the raw material. The average diameter and the average length may be measured by observing the precursor fiber sheet or the porous carbon sheet.

To make the porous carbon sheet excellent in mechanical strength and water removal properties, it is important to incorporate natural pulp into the precursor fiber sheet, particularly the carbon fiber paper sheet. The content of natural pulp is preferably 5 to 100 parts by mass, more preferably 20 to 80 parts by mass, still more preferably 30 to 60 parts by mass based on 100 parts by mass of short carbon fibers. When the content of natural pulp is too small, the pulp carbide that bonds short carbon fibers in the obtained porous carbon sheet is reduced, and mechanical strength may be deteriorated. When the content of natural pulp is too large, the pulp carbide develops excessively in a mesh pattern in the obtained porous carbon sheet to inhibit the mass transfer of hydrogen and oxygen required for the power generation reaction, and of water generated by the power generation reaction, and particularly the power generation performance under high humidification conditions may be deteriorated.

As long as the pulp is obtained from a naturally occurring material such as wood or grass, the pulp is included in the natural pulp even if it is treated with an acidic solution or an alkaline solution.

The natural pulp may be wood pulp, bagasse pulp, straw pulp, kenaf pulp, bamboo pulp, hemp pulp, cotton linter pulp or the like. The natural pulp is preferably wood pulp.

Herein, to reduce the appearance defects of the porous carbon sheet due to holes, foreign matter, and burned deposits, the natural pulp should have an ash content of 0.15 mass % or less. The ash content is especially preferably 0.13 mass % or less, more preferably 0.1 mass % or less.

Ash refers to inorganic components such as metal ions contained in natural pulp, and the ash content can be measured according to JIS P 8251: 2003 "Paper, board and pulps—Determination of residue (ash) on ignition at 900° C.".

It is expected that a certain amount of ash contained in natural pulp gives elasticity to the paper sheet and improves handleability. From this viewpoint, it is preferable that the ash content in the natural pulp be 0.03 mass % or more rather than zero.

Natural pulp having an ash content of 0.15 mass % or less can be obtained by treating general natural pulp with an acidic solution.

The acid in the acidic solution when treating the natural pulp with the acidic solution may be either of an organic acid such as formic acid, oxalic acid, or acetic acid, and an inorganic acid such as sulfuric acid, sulfurous acid, hydrochloric acid, or nitric acid, and is not particularly limited. A relatively inexpensive acid such as sulfuric acid, sulfurous acid, or hydrochloric acid is preferably used, and sulfurous acid is more preferably used. The solution is usually an aqueous solution. Natural pulp treated with a solution containing at least sulfurous acid is called sulfite pulp, and can be suitably used because it has a very low ash content.

A sulfite is usually added to the acidic solution used to treat natural pulp for the purpose of adjusting the pH of the liquid mixture of pulp and an acid and suppressing reduction in viscosity of the liquid mixture. That is, it is preferable that the acidic solution used to treat the natural pulp contain a sulfite in addition to sulfurous acid. As for the sulfite, examples of the metal for this salt include alkali metals such as lithium, sodium, and potassium, and alkaline earth metals such as magnesium, calcium, strontium, and barium. One type of sulfite may be used singly or two or more types of sulfites may be used, and relatively inexpensive calcium sulfite is preferably used. More preferably, magnesium sulfite that hardly causes scale troubles in the process is used. When treating the pulp with an acidic solution, usual treatment conditions are a pH of 1 to 3, a temperature of 125 to 150° C., and a period of 5 to 24 hours.

To not inhibit the mass transfer inside the fuel cell, it is particularly preferable to use sulfite pulp made of not so fibrillated wood pulp. In particular, hardwood sulfite pulp (LDPT) which is also used as a raw material of viscose rayon is more preferable.

The precursor fiber sheet should contain an easily carbonizable resin as described later in order that the easily carbonizable resin may form a bonding carbide in the obtained porous carbon sheet. The content of the easily carbonizable resin is preferably 30 to 400 parts by mass, more preferably 50 to 300 parts by mass based on 100 parts by mass of the short carbon fibers. When the content of the easily carbonizable resin is 30 parts by mass or more, it is preferable because the obtained porous carbon sheet is excellent in mechanical strength, electrical conductivity, and thermal conductivity. On the other hand, when the content of the easily carbonizable resin is 400 parts by mass or less, it is preferable because the obtained porous carbon sheet is excellent in gas diffusibility.

The porous carbon sheet preferably contains carbonaceous particles. For this purpose, carbonaceous particles are incorporated into the precursor fiber sheet, particularly the easily carbonizable resin. As the carbonaceous particles, particles same as those used in the microporous layer described later can be mentioned. When the porous carbon sheet includes the carbonaceous particles, the electrical conductivity of the porous carbon sheet itself is improved. The average particle size of the carbonaceous particles is preferably 0.01 to 10 μm, more preferably 1 to 8 μm, still more preferably 3 to 6 μm. The carbonaceous particles are preferably a powder of graphite or carbon black, more preferably a graphite powder. The average particle size of the carbonaceous particles can be obtained from the number average of the particle size distribution obtained by performing dynamic light scattering measurement.

Carbonization treatment of the precursor fiber sheet as described above gives the porous carbon sheet.

In the porous carbon sheet, short carbon fibers are bonded to each other by a bonding carbide. The bonding carbide is a carbon material other than short carbon fibers that bonds the short carbon fibers, and examples thereof include a resin carbide that is a carbonized easily carbonizable resin and a pulp carbide that is carbonized natural pulp. The rate R of bonding carbide is preferably 30 to 60%, more preferably 32 to 58%, still more preferably 35 to 56%. When the rate R of bonding carbide is less than 30%, the tensile strength and electrical conductivity of the porous carbon sheet may be deteriorated. When the rate of bonding carbide exceeds 60%, the resin carbide that bonds short carbon fibers spreads excessively in a webbing shape between the short carbon fibers to inhibit mass transfer of hydrogen and oxygen required for the power generation reaction, and of water generated by the power generation reaction, and particularly the power generation performance under high humidification conditions may be deteriorated.

The rate R of bonding carbide of the porous carbon sheet is the rate of the carbon material other than short carbon fibers in the porous carbon sheet, and can be calculated by formula (I):

$$R(\%)=[(A-B)/A]\times 100 \qquad (I)$$

wherein A is areal weight (g/m$^2$) of the porous carbon sheet, and

B is areal weight (g/m$^2$) of the short carbon fibers.

Herein, the areal weight of the short carbon fibers can be measured in the same manner as in the porous carbon sheet. In a measurement using a carbon fiber paper sheet before being impregnated with an easily carbonizable resin, the carbon fiber paper sheet is heated in the air at 400° C. for 8 hours to thermally decompose the binder, pulp and the like with the short carbon fibers being left as they are.

The average thickness of the porous carbon sheet is 60 to 300 μm, preferably 70 to 250 μm, more preferably 80 to 200 μm. In addition, the bulk density of the porous carbon sheet is 0.2 to 0.4 g/cm$^3$, preferably 0.22 to 0.38 g/cm$^3$, more preferably 0.24 to 0.36 g/cm$^3$. A porous carbon sheet having an average thickness of 60 μm or more has high mechanical strength and is easy to handle. The average thickness and bulk density of the porous carbon sheet are appropriately selected according to the size and operating conditions of the fuel cell. In a fuel cell requiring moisture retention of the electrolyte membrane, it is preferable that the porous carbon sheet be thick and have high bulk density. In a fuel cell requiring gas diffusibility and water removal properties, it is preferable that the porous carbon sheet be thin and have low bulk density. In the precursor fiber sheet, the areal weight of short carbon fibers, the blending amount of the easily carbonizable resin relative to short carbon fibers and the like are adjusted so that the average thickness and bulk density of the porous carbon sheet fall within the above-mentioned ranges.

The average thickness of the porous carbon sheet is represented by the thickness when the porous carbon sheet is pressurized at a surface pressure of 0.15 MPa. Specifically, 20 or more different positions are randomly selected, the individual thicknesses of the positions are measured with a surface pressure of 0.15 MPa being applied to each of the positions in the thickness direction of the sheet using a micrometer having a gauge whose cross section is a circle having a diameter of 5 mm, and the measured individual thicknesses are averaged to give the average thickness of the porous carbon sheet.

The bulk density of the porous carbon sheet can be determined by cutting the porous carbon sheet into ten 10 cm×10 cm square pieces, weighing the pieces using an electronic balance, averaging the weights to give the areal weight (mass per unit area) of the porous carbon sheet, and then dividing the areal weight by the average thickness of the porous carbon sheet described above.

The porous carbon sheet preferably has a tensile strength of 15 to 50 MPa, more preferably 16 MPa or more, still more preferably 17 MPa or more. When the tensile strength is less than 15 MPa, the handleability in production of the porous carbon sheet, water repellent treatment, and formation of the microporous layer by coating may be deteriorated. The higher the tensile strength is, the more it is preferable. However, when the bulk density is about 0.2 to 0.4 g/cm$^3$, the tensile strength is usually no higher than about 50 MPa.

The tensile strength of the porous carbon sheet is determined according to the method defined in JIS P 8113: 2006 "Paper and board—Determination of tensile properties—Part 2: Constant rate of elongation method". In this test, the specimen shall have a width of 15 mm, a length of 100 mm, and a grip interval of 60 mm. The tensile speed shall be 2 mm/min. When the porous carbon sheet is anisotropic, the test is carried out ten times in each of the longitudinal direction and the transverse direction, and the average of the test results is taken as the tensile strength of the porous carbon sheet.

The porous carbon sheet preferably has a number of appearance defects due to short carbon fiber bundles of 1.0 or less, and a total number of appearance defects due to holes, foreign matter, and burned deposits of 0.5 or less, per a unit area of 1 m². The appearance defect due to short carbon fiber bundles may partially press the electrolyte membrane to reduce durability of the electrolyte membrane.

The appearance defect due to short carbon fiber bundles in the porous carbon sheet is a part where a plurality of short carbon fibers are agglomerated to form a knot. The appearance defect is visually distinguishable since it blocks light more than peripheral portions of the porous carbon sheet do when transmitted light is passed through the porous carbon sheet.

The appearance defects of the porous carbon sheet include appearance defects due to holes, foreign matter, and burned deposits present in the porous carbon sheet, in addition to the appearance defects due to short carbon fiber bundles. The hole is produced when impurities or the like disappear. In a porous carbon sheet having many holes, pressure is not applied to some part of the electrolyte membrane, the durability of the electrolyte membrane is reduced when it swells by absorbing water or shrinks upon drying, and the electrolyte membrane tends to dry partially. The foreign matter is impurities or the like that remain without being burned out at the time of baking. A porous carbon sheet having foreign matter may inhibit diffusibility. A burned deposit is impurities or the like that are carbonized and remain between short carbon fibers. A porous carbon sheet having burned deposits may inhibit diffusibility. Therefore, the appearance defects should be eliminated by inspection, and it is preferable from the viewpoint of increasing the yield and reducing the inspection man-hours that the number of appearance defects be small.

The size of the matter which is regarded as an appearance defect depends on the operating conditions and the durability of the electrolyte membrane. Generally, in a short carbon fiber bundle, the appearance defect is a portion that is more convex than the surface of the porous carbon sheet and where the bundle can be visually recognized. Usually, the appearance defect has a convex feel when the surface of the porous carbon sheet is touched with the ball of a finger. Meanwhile, the hole refers to a portion penetrating the porous carbon sheet, and has a longest diameter of 0.5 mm or more. The foreign matter and burned deposit refer to those having a longest diameter of 1.5 mm or more.

The number of appearance defects due to short carbon fiber bundles, holes, foreign matter, and burned deposits can be counted by visually observing the porous carbon sheet with reflected light and transmitted light, for example. It is also possible to employ a method of inspecting the porous carbon sheet by identifying the appearance defects through visual observation or image processing while conveying the roll, as in an appearance defect inspection apparatus. Hereinafter, the number of appearance defects may be simply referred to as the number of defects.

The precursor fiber sheet is usually formed by impregnating a carbon fiber paper sheet including short carbon fibers with an easily carbonizable resin. It is especially effective to control the areal weight of the short carbon fibers and the blending amount of the easily carbonizable resin relative to the short carbon fibers in the precursor fiber sheet to obtain our porous carbon sheet. A porous carbon sheet having a low bulk density can be obtained by reducing the areal weight of the short carbon fibers in the precursor fiber sheet. A porous carbon sheet having a high bulk density can be obtained by increasing the areal weight of the short carbon fibers in the precursor fiber sheet. A porous carbon sheet having a low bulk density can be obtained by reducing the blending amount of the easily carbonizable resin relative to the short carbon fibers. A porous carbon sheet having a high bulk density can be obtained by increasing the blending amount of the easily carbonizable resin relative to the short carbon fibers. In addition, at the same level of the areal weight of short carbon fibers, a thicker precursor fiber sheet gives a substrate having a low bulk density. A thinner precursor fiber sheet gives a porous carbon sheet having a high bulk density. Porous carbon sheets having such bulk densities can be obtained by controlling the areal weight of the short carbon fibers and the blending amount of the easily carbonizable resin relative to the short carbon fibers in the precursor fiber sheet, and the thickness of the porous carbon sheet in the production method described later.

The porous carbon sheet preferably contains a water-repellent resin. The water-repellent resin is not particularly limited, and examples thereof include fluororesins such as a polychlorotrifluoroethylene resin (PCTFE), a polytetrafluoroethylene resin (PTFE), a polyvinylidene fluoride resin (PVDF), a copolymer of tetrafluoroethylene and hexafluoropropylene (FEP), a copolymer of tetrafluoroethylene and perfluoropropyl vinyl ether (PFA), and a copolymer of tetrafluoroethylene and ethylene (ETFE). The additional amount of the water-repellent resin is preferably 1 to 50 parts by mass, more preferably 3 to 40 parts by mass based on 100 parts by mass of the porous carbon sheet before the addition of the water-repellent resin. When the additional amount of the water-repellent resin is 1 part by mass or more, the porous carbon sheet is more excellent in water removal properties, and when it is 50 parts by mass or less, the porous carbon sheet is more excellent in electrical conductivity.

Herein, if the water-repellent resin is unevenly distributed on the side of the microporous layer described later in the porous carbon sheet, it is preferable because the blending amount of the expensive water-repellent resin can be minimized without deteriorating the water removal properties for removing water from the catalyst layer side to the separator side. To confirm whether or not the water-repellent resin is unevenly distributed in the porous carbon sheet, the following method can be employed: the porous carbon sheet is magnified about 400-fold under a microscope such as a scanning electron microscope, and the concentration distribution of fluorine in the sectional direction of the porous carbon sheet is analyzed with an energy dispersive X-ray analyzer, an electron beam microanalyzer or the like.

The pore size of the porous carbon sheet is preferably 20 to 80 μm, more preferably 25 to 75 μm, still more preferably 30 to 70 μm. When the pore size is 20 μm or more, the water removal properties are improved and flooding can be prevented. When the pore size is 80 μm or less, higher electrical conductivity is attained, and the power generation performance is improved at both high and low temperatures.

Herein, the pore size of the porous carbon sheet is determined as a peak of a pore size distribution obtained by measuring the pores by a mercury intrusion technique at a pressure of 6 kPa to 414 MPa (pore size: 30 nm to 400 μm). When a plurality of peaks are obtained, the highest peak value is adopted. As a measuring apparatus, AutoPore 9520 manufactured by Shimadzu Corporation or a similar product can be used.

The porous carbon sheet preferably has a microporous layer containing carbonaceous particles formed thereon. Usually, the microporous layer contains carbonaceous particles in a mass fraction of 5 to 95 mass % relative to the total amount.

When a microporous layer is formed, the microporous layer may be disposed on only one surface and/or impregnated into the inside and/or disposed on both surfaces of the porous carbon sheet. The gas diffusion layer is required to have high gas diffusibility to diffuse a gas supplied from a separator to a catalyst, high water removal properties to remove water generated by an electrochemical reaction to the separator, and high electrical conductivity to extract the generated current. In addition, since the gas diffusion layer is required to have a function of promoting reverse diffusion of moisture into the electrolyte membrane, the microporous layer has electrical conductivity, and is preferably a porous body having an average pore size of 10 to 100 nm. More specifically, the microporous layer is preferably formed by mixing carbonaceous particles with a water-repellent resin, for example.

Examples of carbonaceous particles include graphite, carbon black, graphene, single-walled carbon nanotubes, multi-walled carbon nanotubes, carbon nanofibers such as vapor grown carbon fibers, and carbon fiber milled fibers. Among them, carbon black is preferable. It is more preferable that the particle size of the carbonaceous particles be 10 to 200 nm.

The particle size of the carbonaceous particles refers to the particle size obtained using a transmission electron microscope. The particle size of granular carbon is obtained by observing the carbonaceous particles with a transmission electron microscope at a measurement magnification of 500,000-fold, measuring the outer diameter of 100 particles present in the screen, and calculating the average value of the outer diameters. Herein, the outer diameter refers to the maximum diameter of the particle (that is, the long diameter of the particle that indicates the longest diameter of the particle). As a transmission electron microscope, JEM-4000 EX manufactured by JEOL Ltd. or a similar product can be used.

The carbonaceous particles refer to fine particles of carbon having a carbon atom percentage of 80% or more and a primary particle size of about 3 to 500 nm. When carbonaceous particles having a carbon atom percentage of 80% or more are used, the electrical conductivity and corrosion resistance of the microporous layer are improved. Meanwhile, when carbonaceous particles having a primary particle size of 500 nm or less are used, the electrical conductivity and mechanical properties of the microporous layer are improved due to an increase in particle density per unit mass and development of the structure.

Examples of the carbon black include furnace black, channel black, acetylene black, and thermal black. Among them, it is preferable to use acetylene black having high electrical conductivity and low impurity content.

It is also preferable that the microporous layer contain carbon nanofibers to improve electrical conductivity. When the microporous layer contains carbon nanofibers, the void fraction of the microporous layer is increased and the electrical conductivity is also improved. The fiber diameter of the carbon nanofibers is preferably 1 to 1,000 nm, more preferably 10 to 500 nm. When carbon nanofibers having a fiber diameter less than 1 nm are used, the void fraction of the microporous layer is reduced, and the water removal properties sometimes do not improve as much as expected. On the other hand, when carbon nanofibers having a fiber diameter exceeding 1,000 nm are used, the smoothness of the microporous layer is lowered, and the contact resistance sometimes increases.

Carbon nanofibers refer to fibers having a carbon atom percentage of 90% or more and an aspect ratio of 10 or more. Since carbon nanofibers have a carbon atom percentage of 90% or more and an aspect ratio of 10 or more, use of the carbon nanofibers improves the electrical conductivity and mechanical properties of the microporous layer.

The aspect ratio of the carbon nanofibers refers to the ratio between the fiber diameter and the fiber length obtained using a transmission electron microscope. The carbon nanofibers are observed with a transmission electron microscope at a measurement magnification of 500,000-fold, diameters and lengths of 100 fibers present in the screen are measured, and the aspect ratio is calculated by dividing the average fiber length by the average fiber diameter. As a transmission electron microscope, JEM-4000 EX manufactured by JEOL Ltd. or a similar product can be used.

Examples of the carbon nanofibers include single-walled carbon nanotubes, double-walled carbon nanotubes, multi-walled carbon nanotubes, carbon nanohorns, carbon nanocoils, cup stacked carbon nanotubes, bamboo-shaped carbon nanotubes, vapor grown carbon fibers, and graphite nanofibers. Among them, it is preferable to use single-walled carbon nanotubes, double-walled carbon nanotubes, multi-walled carbon nanotubes, or vapor grown carbon fibers, because they are large in aspect ratio and excellent in electrical conductivity and mechanical properties. The vapor grown carbon fibers are carbon fibers formed by growing carbon in a vapor phase by the action of a catalyst, and preferably have an average diameter of 5 to 200 nm and an average fiber length of 1 to 20 μm.

To improve the water removal properties of the microporous layer, the microporous layer may contain a water-repellent resin in combination with the carbonaceous particles such as carbon black and carbon nanofibers. Examples of the water-repellent resin include fluororesins such as a polychlorotrifluoroethylene resin (PCTFE), a polytetrafluoroethylene resin (PTFE), a polyvinylidene fluoride resin (PVDF), a copolymer of tetrafluoroethylene and hexafluoropropylene (FEP), a copolymer of tetrafluoroethylene and perfluoropropyl vinyl ether (PFA), and a copolymer of tetrafluoroethylene and ethylene (ETFE). Herein, the fluororesin refers to a resin having a fluorine atom in its structure and having water repellency.

When a water-repellent resin is blended in the microporous layer, the blending amount thereof is preferably 1 to 70 parts by mass, more preferably 5 to 60 parts by mass based on 100 parts by mass of the carbonaceous particles in the microporous layer. When the blending amount of the water-repellent resin is 1 part by mass or more, the microporous layer is more excellent in water removal properties and mechanical strength. When the blending amount of the water-repellent resin is 70 parts by mass or less, the microporous layer is more excellent in electrical conductivity. The carbonaceous particles constituting the microporous layer may be, for example, a mixture of carbonaceous particles such as acetylene black, and carbon nanofibers.

The average thickness of the microporous layer is preferably 10 to 55 μm, more preferably 15 to 50 μm, still more preferably 20 to 45 μm. When the average thickness of the microporous layer is 10 μm or more, it is possible to prevent the short carbon fibers of the porous carbon sheet from sticking in the electrolyte membrane. When the average thickness of the microporous layer is 55 μm or less, it is preferable because the electric resistance of the microporous layer can be reduced, and the frequency of surface cracks of the microporous layer can be reduced to 1 or less per 1-mm square.

Herein, the average thickness of the microporous layer can be determined by subtracting the average thickness of the porous carbon sheet before formation of the microporous layer, which is measured in advance, from the average thickness of the porous carbon sheet including the microporous layer.

The number of surface cracks of the microporous layer is determined as follows: 5 different positions are randomly selected in the surface of the microporous layer, photographs of the positions are taken under a microscope such as an optical microscope at a magnification of about 50 to 100-fold, the number of independent cracks present in an arbitrary 1-mm square area is counted, and the average number of cracks in each image is calculated. As an optical microscope, a digital microscope manufactured by Keyence Corporation or a similar product can be used.

The void fraction of the microporous layer is preferably 50 to 85%, more preferably 60 to 80%. When the void fraction is 50% or more, water removal properties and gas diffusibility from the gas diffusion layer are improved. When the void fraction is 85% or less, the microporous layer has excellent mechanical strength.

The void fraction of the microporous layer can be determined as follows: 5 different positions are randomly selected from a cross section of the microporous layer orthogonal to the sheet surface, photographs of the positions are taken under a microscope such as a scanning electron microscope at a magnification of about 20,000-fold, the images are binarized by image processing, individual void fractions are calculated using the binarized images, and the average value of the individual void fractions of the images is calculated. Image processing can be performed by the following method, for example.

Figure 3:
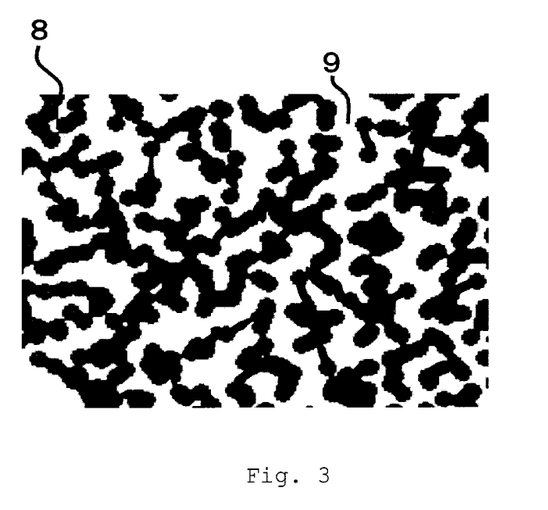
FIG. 3 is a schematic view obtained by binarizing an image of the microporous layer and extracting voids in the image.

Calculate the area of the processing region (number of vertical pixels×number of horizontal pixels) as the total area.
  The image is 9-pixel averaged (number of vertical pixels 3×number of horizontal pixels 3), and an image with any pixel-wise noise removed is regarded as image 1.
  A region (cross section of microporous layer) of image 1, which has a luminance not lower than an arbitrary average luminance value at which a part other than voids is detected, is extracted and regarded as image 2.
  Only islands having an area of 100 pixels or more in image 2 are left as image 3.
  Image 3 is subjected to circular closing with a radius of 2.5 pixels (small holes are filled) to form image 4. An example of image 4 is shown in FIG. 3.
  Determine the area of image 4 (=non-void part).
  The area of the voids, which is obtained by subtracting the area of image 4 from the total area, is divided by the total area to calculate the individual void fraction.

Individual void fractions are obtained at 5 positions, and the average value thereof is calculated as the void fraction. As a scanning electron microscope, S-4800 manufactured by Hitachi, Ltd. or a similar product can be used. As image processing software, "HALCON (registered trademark)" 9.0 manufactured by MVTec or a similar product can be used.

Next, a production method suitable to obtain the porous carbon sheet, and the precursor fiber sheet thereof will be specifically described.

Carbon Fiber Paper Sheet

To obtain a carbon fiber paper sheet including short carbon fibers, for example, a wet papermaking method in which such carbon fiber paper sheet is produced by dispersing short carbon fibers in a liquid or a dry papermaking method in which such carbon fiber paper sheet is produced by dispersing short carbon fibers in the air is employed. Among them, a wet papermaking method capable of giving a thin carbon fiber paper sheet is preferably used.

To increase the mechanical strength, it is important to mix the above-mentioned natural pulp in short carbon fibers and subject the mixture to papermaking. The content of natural pulp in the carbon fiber paper sheet is preferably 5 to 100 parts by mass, more preferably 20 to 80 parts by mass, still more preferably 30 to 60 parts by mass based on 100 parts by mass of short carbon fibers. When the content of natural pulp is less than 5 parts by mass, the pulp carbide that bonds short carbon fibers in the obtained porous carbon sheet is reduced, and mechanical strength may be deteriorated. When the content of natural pulp exceeds 100 parts by mass, the pulp carbide develops excessively in a mesh pattern in the obtained porous carbon sheet to inhibit the mass transfer of hydrogen and oxygen required for the power generation reaction, and of water generated by the power generation reaction, and particularly the power generation performance under high humidification conditions may be deteriorated.

To maintain the in-plane electrical conductivity and thermal conductivity to be isotropic, the carbon fiber paper sheet is preferably a sheet in which short carbon fibers are randomly dispersed in a two-dimensional plane.

Although the pore size distribution in the carbon fiber paper sheet is influenced by the content and dispersion state of the short carbon fibers, generally the pores can have a size of about 20 to 100 μm.

In the carbon fiber paper sheet, the areal weight of the short carbon fibers is preferably 10 to 50 $g/m^2$, more preferably 20 to 40 $g/m^2$. When the areal weight of the short carbon fibers is 10 $g/m^2$ or more, the obtained porous carbon sheet is excellent in mechanical strength. When the areal weight of the short carbon fibers is 50 $g/m^2$ or less, the obtained porous carbon sheet is more excellent in gas diffusibility and water removal properties. When a plurality of carbon fiber paper sheets are laminated to each other, it is preferable that the areal weight of the short carbon fibers be within the above-mentioned range after the lamination.

Herein, the areal weight of the short carbon fibers in the carbon fiber paper sheet can be determined by retaining a carbon fiber paper sheet cut into a 10-cm square piece under a nitrogen atmosphere in a 450° C. electric furnace for 15 minutes, and then dividing the mass of the resulting residue by the area of the carbon fiber paper sheet (0.01 $m^2$).

Method of Producing Precursor Fiber Sheet

A precursor fiber sheet is prepared by impregnating a carbon fiber paper sheet with a heat-carbonizable resin, that is, a so-called easily carbonizable resin. As a method of impregnating the carbon fiber paper sheet with an easily carbonizable resin, there are a method of immersing the carbon fiber paper sheet in a solution containing an easily carbonizable resin, a method of applying a solution containing an easily carbonizable resin to the carbon fiber paper sheet, and a method of overlaying and transferring a film made of an easily carbonizable resin onto the carbon fiber paper sheet. Among them, a method of immersing the paper sheet in a solution containing an easily carbonizable resin is preferably employed because it is excellent in productivity.

Herein, the easily carbonizable resin is carbonized into a conductive carbide at the time of baking. Thus, after baking, the precursor fiber sheet can have a structure in which short carbon fibers are bonded to each other by the carbide. To the easily carbonizable resin, a solvent or the like may be added as necessary. The easily carbonizable resin is a resin such as a thermosetting resin, and may further contain, as necessary, a carbonaceous filler, a surfactant and the like. In addition, the carbonization yield of the easily carbonizable resin is preferably 40 mass % or more. When the carbonization yield is 40 mass % or more, it is preferable because the porous carbon sheet has excellent mechanical strength, electrical conductivity, and thermal conductivity. The higher the carbonization yield is, the better it is. However, in the current state of the art, the carbonization yield is generally 70 mass % or less.

As the easily carbonizable resin, thermosetting resins such as a phenolic resin, an epoxy resin, a melamine resin, and a furan resin can be mentioned. Among them, a phenolic resin is preferably used because of its high carbonization yield. Further, to improve the mechanical strength, electrical conductivity, and thermal conductivity of the porous carbon sheet, additives added to the easily carbonizable resin as necessary may include a carbonaceous filler typified by the above-mentioned carbonaceous particles. Herein, as the carbonaceous filler, for example, carbon black, carbon nanotubes, carbon nanofibers, milled carbon fibers, or graphite can be used.

The easily carbonizable resin can be used as it is to be impregnated into the carbon fiber paper sheet. For the purpose of enhancing the impregnating property into the carbon fiber paper sheet, the easily carbonizable resin may be optionally dissolved or dispersed in various solvents and impregnated into the carbon fiber paper sheet. Herein, as the solvent, for example, water, methanol, ethanol, isopropyl alcohol, or acetone can be used.

The impregnation amount of the easily carbonizable resin into the carbon fiber paper sheet is preferably 30 to 400 parts by mass, more preferably 50 to 300 parts by mass based on 100 parts by mass of the short carbon fibers. When the impregnation amount of the easily carbonizable resin is 30 parts by mass or more, it is preferable because the obtained porous carbon sheet is excellent in mechanical strength, electrical conductivity, and thermal conductivity. On the other hand, when the impregnation amount of the easily carbonizable resin is 400 parts by mass or less, it is preferable because the obtained porous carbon sheet is excellent in gas diffusibility.

Further, the method of producing a precursor fiber sheet includes short carbon fibers having an average length of 3 to 10 mm, natural pulp having an ash content of 0.15 mass % or less, and a heat-carbonizable resin. The method preferably includes a step of obtaining the natural pulp by treatment with an acidic solution for the above-mentioned reason. The acidic solution in this step preferably contains at least sulfurous acid, and more preferably contains a sulfite in addition to sulfurous acid.

Lamination and Heat Treatment

After the precursor fiber sheet is formed, lamination of precursor fiber sheets and heat treatment can be performed prior to the carbonization treatment. A plurality of precursor fiber sheets can be laminated to each other for the purpose of obtaining a porous carbon sheet having a predetermined thickness. In this case, it is possible to laminate a plurality of precursor fiber sheets having the same properties. It is also possible to laminate a plurality of precursor fiber sheets having different properties. Specifically, it is possible to laminate a plurality of precursor fiber sheets different in average diameter and average length of short carbon fibers, kind of natural pulp, areal weight of short carbon fibers of the carbon fiber paper sheet, areal weight of natural pulp, impregnation amount of the easily carbonizable resin, and the like.

The precursor fiber sheet can be heat-treated to thicken and partially crosslink the easily carbonizable resin. As a heat treatment method, for example, a method of blowing hot air to the precursor fiber sheet, a method of heating the precursor fiber sheet by sandwiching the precursor fiber sheet between hot plates of a press apparatus, or a method of heating the precursor fiber sheet by sandwiching the precursor fiber sheet between continuous belts can be employed. Further, as necessary, it is also possible to pressurize the precursor fiber sheet simultaneously with the heat treatment for the purpose of adjusting the thickness after the heat treatment and making the precursor fiber sheet uniform.

Carbonization Treatment

One or more precursor fiber sheets obtained as described above are laminated as necessary, subjected to heat treatment or the like, and then subjected to a so-called carbonization step of heating the precursor fiber sheets at a temperature within a range having a maximum temperature of 1,300 to 3,000° C. to convert the natural pulp and the easily carbonizable resin into a bonding carbide. In the carbonization step, a heat treatment in an inert atmosphere, that is, so-called baking is performed to carbonize the natural pulp and the easily carbonizable resin. For this baking, a batch-type heating furnace or a continuous heating furnace can be used. Further, the inert atmosphere can be produced by allowing an inert gas such as nitrogen gas or argon gas to flow in the heating furnace.

The maximum baking temperature is 1,300 to 3,000° C., preferably 1,700 to 2,850° C., more preferably 1,900 to 2,700° C. When the maximum temperature is 1,300° C. or more, it is preferable because carbonization of the easily carbonizable resin proceeds and the porous carbon sheet becomes excellent in electrical conductivity and thermal conductivity. On the other hand, when the maximum temperature is 3000° C. or less, it is preferable because the operating cost of the heating furnace is reduced. Carbonization treatment of the precursor fiber sheet as described above gives a porous carbon sheet.

Water Repellent Treatment

The porous carbon sheet may be subjected to a water repellent treatment for the purpose of improving the water removal properties. The water repellent treatment can be carried out by adding a water-repellent resin to the porous carbon sheet. As a method of adding the water-repellent resin to the porous carbon sheet, there are a method of immersing the porous carbon sheet in a dispersion liquid containing a water-repellent resin, a method of applying a dispersion liquid containing a water-repellent resin to the porous carbon sheet, and a method of overlaying and transferring a film made of a water-repellent resin onto a porous carbon sheet. Among them, a method of immersing a porous carbon sheet in a dispersion liquid containing a water-repellent resin is preferably employed because it is excellent in productivity.

Drying of Water-Repellent Coating

It is preferable to dry a dispersion liquid containing a water-repellent resin at a temperature of 80 to 200° C.

Microporous Layer

A microporous layer may be formed on the porous carbon sheet. The microporous layer is formed by applying to one surface or both surfaces of the porous carbon sheet a carbonaceous particle dispersion liquid containing carbonaceous particles dispersed in a dispersion medium such as water or an organic solvent. In the carbonaceous particle dispersion liquid, a water-repellent resin same as that used in the above-mentioned water repellent treatment is usually mixed. As a coating method, for example, die coater coating, kiss coater coating, screen printing, rotary screen printing, spraying, intaglio printing, gravure printing, bar coating, or blade coating can be employed. It is preferable to employ die coater coating which enables accurate control of the coating amount irrespective of the surface roughness of the porous carbon sheet.

The dispersion liquid may contain a dispersing aid such as a surfactant. The dispersion medium used in the dispersion liquid is preferably water. It is more preferred that a nonionic surfactant be used as the dispersing aid.

Drying of Microporous Layer

The porous carbon sheet having the microporous layer formed thereon is preferably heated at a temperature of 80 to 200° C. before being subjected to the next step to remove (dry) the dispersion medium contained in the microporous layer.

Sintering

As necessary, the porous carbon sheet having the microporous layer formed thereon is charged into or passed through a muffle furnace, a baking furnace, or a high-temperature dryer and heated at 300 to 380° C. for 1 to 30 minutes to sinter. When a water-repellent resin is used, the resin melts by sintering and serves as a binder between carbonaceous particles to form the microporous layer.

The above-mentioned coating methods are merely illustrative and the coating method is not necessarily limited thereto.

Next, a membrane electrode assembly (MEA) and a fuel cell including a gas diffusion layer (when the layer includes a water-repellent treatment and a microporous layer) including the porous carbon sheet will be described with reference to FIG. 2.

A membrane electrode assembly can be formed by joining the above-mentioned porous carbon sheet as a gas diffusion layer to at least one surface of a solid polymer electrolyte membrane 7 having catalyst layers 6 on both surfaces. In this case, it is preferable to dispose a microporous layer 5 on the side of the catalyst layer 6, that is, dispose the microporous layer 5 in contact with the catalyst layer 6 to form the membrane electrode assembly.

A fuel cell is formed by arranging separators (not shown) on both sides of the membrane electrode assembly. Usually, a plurality of such membrane electrode assemblies, each sandwiched between separators with a gasket interposed between the membrane electrode assembly and the separator, are stacked to form a polymer electrolyte fuel cell. The catalyst layer 6 is composed of a layer containing a solid polymer electrolyte and catalyst-supported carbon. As the catalyst, platinum is usually used. In a fuel cell in which a carbon monoxide-containing reformed gas is fed to the anode, platinum and ruthenium are preferably used as catalysts of the anode. As the solid polymer electrolyte, a perfluorosulfonic acid-based polymer material having high proton conductivity, oxidation resistance and heat resistance is preferably used. The structures of such fuel cell unit and fuel cell are well known per se.

EXAMPLES

Hereinafter, our sheets, precursor sheets and methods will be concretely described by way of examples. Measurement methods of various properties used in the examples are shown below.

Measurement of Ash Content in Pulp

An absolute dry sample was prepared at 105° C.±2° C. according to JIS P 8203: 2010 (ISO 638: 2008) "Paper, board and pulps—Determination of dry matter content—Oven-drying method".

The ash content was measured at a combustion temperature of 900° C.±25° C. according to JIS P 8251: 2003 "Paper, board and pulps—Determination of residue (ash) on ignition at 900° C." using the absolute dry sample. The ash content was a value for the absolute dry sample and was determined as the average value of the repetition number 2 (n=2).

Measurement of Average Thickness of Porous Carbon Sheet

The average thickness of the porous carbon sheet (including the porous carbon sheet having a microporous layer formed thereon) was determined in the following manner. Specifically, 20 different positions were randomly selected from the sheet-shaped test substance for measurement, the individual thicknesses of the positions were measured with the positions being pressurized at a surface pressure of 0.15 MPa using a micrometer having a gauge whose cross section is a circle having a diameter of 5 mm (micrometer MF-501 manufactured by Nikon Corporation), and the measured individual thicknesses were averaged to give the average thickness of the porous carbon sheet.

Measurement of Average Thickness of Microporous Layer

The average thickness of the microporous layer was determined by subtracting the average thickness of the porous carbon sheet before formation of the microporous layer, which had been measured in advance, from the average thickness of the porous carbon sheet including the microporous layer.

Measurement of Bulk Density of Porous Carbon Sheet

The bulk density of the porous carbon sheet was determined by weighing the porous carbon sheet using an electronic balance to obtain the areal weight (mass per unit area) of the porous carbon sheet, and then dividing the areal weight by the average thickness of the porous carbon sheet.

Measurement of Tensile Strength of Porous Carbon Sheet

The tensile strength of the porous carbon sheet was measured in accordance with the method defined in JIS P 8113: 2006. The specimen had a width of 15 mm, a length of 100 mm, and a grip interval of 60 mm. The tensile speed was 2 mm/min. Since the porous carbon sheet was anisotropic, the test was carried out ten times in each of the longitudinal direction and the transverse direction, and the average of the test results was taken as the tensile strength of the porous carbon sheet.

Number of Appearance Defects in Porous Carbon Sheet

The number of appearance defects (short carbon fiber bundles, holes, foreign matter, and burned deposits) in the porous carbon sheet was visually inspected using an appearance defect inspection apparatus attached to a conveying device while conveying the roll. The appearance defect inspection apparatus attached to the conveying device refers to a device that irradiates both surfaces of a porous carbon sheet with light so that appearance defects can be visually observed continuously by reflected light and transmitted light.

Evaluation of Power Generation Performance of Polymer Electrolyte Fuel Cell

A catalyst liquid was prepared by sequentially adding 1.00 g of platinum-supported carbon (manufactured by Tanaka Kikinzoku Kogyo K.K., amount of platinum: 50 mass %), 1.00 g of purified water, 8.00 g of a "NAFION (registered trademark)" solution (5.0 mass % of "NAFION (registered trademark)" manufactured by Aldrich Chemical Co., Inc.) and 18.00 g of isopropyl alcohol (manufactured by Nacalai Tesque, Inc.).

Then, onto a "NAFLON (registered trademark)" PTFE tape "TOMBO (registered trademark)" No. 9001 (manufactured by Nichias Corporation), which had been cut into a size of 7 cm×7 cm, the obtained catalyst liquid was applied using a spray and dried at room temperature to prepare a PTFE sheet with a catalyst layer having a platinum amount of 0.3 mg/cm$^2$. Subsequently, a solid polymer electrolyte membrane, "NAFION (registered trademark)" NRE-211cs (manufactured by DuPont), was cut into a size of 10 cm×10 cm and sandwiched between the two PTFE sheets each with a catalyst layer. The resultant was hot-pressed at a temperature of 130° C. using a flat press at a pressure of 5 MPa to transfer the catalyst layer onto the solid polymer electrolyte membrane. After pressing, the PTFE sheets were removed to prepare a solid polymer electrolyte membrane with a catalyst layer.

Next, the thus obtained solid polymer electrolyte membrane with a catalyst layer was sandwiched between two porous carbon sheets (gas diffusion layers) each cut into a size of 7 cm×7 cm, and the resultant was hot-pressed at a temperature of 130° C. using a flat press at a pressure of 3 MPa to prepare a membrane electrode assembly. When the gas diffusion layer had a microporous layer, the gas diffusion layer was disposed so that the surface having the microporous layer was in contact with the catalyst layer.

The thus obtained membrane electrode assembly was incorporated into a fuel cell evaluation unit cell and the voltage in varying the current density was measured. Herein, as a separator, a serpentine-type separator having one flow channel that is 1.5 mm in channel width, 1.0 mm in channel depth and 1.1 mm in rib width was used. Further, hydrogen pressurized to 210 kPa was supplied to the anode and air pressurized to 140 kPa was supplied to the cathode, and evaluation was performed. The hydrogen and air were both humidified using a humidification pot whose temperature was set at 70° C. The utilization of the hydrogen and atmospheric oxygen were set to 80% and 67%, respectively.

First, the output voltage was measured at an operating temperature kept at 65° C. and at a current density of 2.2 A/cm$^2$, and the measured value was used as an index of low-temperature performance (anti-flooding characteristics).

Then, the current density was set at 1.2 A/cm$^2$, and the output voltage was measured during a repeated cycle of retaining the operating temperature at 80° C. for 5 minutes and increasing the temperature from 80° C. by 2° C. over 5 minutes. Thus, the upper limit temperature at which the fuel cell is capable of generating power was determined and used as an index of high-temperature performance (anti-dry-out characteristics).

Example 1

Carbon Fiber Paper Sheet Production Step

The following papermaking step was carried out: a polyacrylonitrile-based carbon fiber "TORAYCA (registered trademark)" T300-6K (average monofilament diameter: 7 µm, number of monofilaments: 6,000) manufactured by Toray Industries, Inc. was cut into a length of 6 mm, and continuously subjected to papermaking together with hardwood sulfite pulp (LDPT: natural pulp treated with a liquid mixture of sulfurous acid and a sulfite) manufactured by Nippon Paper Chemicals Co., Ltd. using water as a papermaking medium, and the resultant was immersed in a 10 mass % aqueous solution of polyvinyl alcohol and dried. The product was wound up into a roll to give a long carbon fiber paper sheet including short carbon fibers having an areal weight of 15.7 g/m$^2$. The added amount of pulp and the adhered amount of polyvinyl alcohol corresponded to 50 parts by mass and 35 parts by mass, respectively, based on 100 parts by mass of short carbon fibers.

Resin Impregnation Step

A dispersion liquid was prepared by mixing scaly graphite (average particle size: 5 µm), a phenolic resin, and methanol at a mass ratio of 1:9:50. The carbon fiber paper sheet was subjected to the resin impregnation step at a temperature of 90° C. by continuously impregnating the carbon fiber paper sheet with the dispersion liquid so that the amount of the phenolic resin impregnated into the paper sheet would be 104 parts by mass based on 100 parts by mass of the short carbon fibers to give a precursor fiber sheet. The used phenolic resin was a resin obtained by mixing a resol type phenolic resin with a novolac type phenolic resin at a mass ratio of 1:1.

Heat Treatment Step

Upper and lower heating plates were set in a flat press so that the plates would be parallel to each other, and the precursor fiber sheet treated so that one position of the sheet would be heated and pressurized for 6 minutes in total by intermittently conveying the sheet that was vertically sandwiched between release paper while repeatedly opening and closing the press at a hot plate temperature of 170° C. and a surface pressure of 0.8 MPa. The effective length of pressurization LP of the hot plate was 1,200 mm, the feed amount LF of the precursor fiber sheet in intermittent conveyance was 100 mm, and LF/LP was 0.08. That is, heat treatment was carried out by repeating heating and pressurization for 30 seconds, opening the mold, and feeding the precursor fiber sheet (100 mm), and the precursor fiber sheet was wound up into a roll.

Carbonization Step

The heat-treated precursor fiber sheet was introduced into a heating furnace having a maximum temperature of 2400° C. kept in a nitrogen gas atmosphere. While being continuously transferred in the heating furnace, the precursor fiber sheet was subjected to a carbonization step of baking the sheet at a heating rate of about 500° C./min (400° C./min up to 650° C., and 550° C./min at a temperature exceeding 650° C.), and then wound up into a roll to give a porous carbon sheet. Through the carbonization step, a porous carbon sheet having a thickness of 100 µm, an areal weight of 24 g/m$^2$, and a bulk density of 0.24 g/cm$^3$ was obtained.

In this porous carbon sheet, the number of defects due to short carbon fiber bundles was 0.09, and the total number of defects due to other appearance defects was 0.21 (the number of defects due to holes was 0.14, the number of defects due to foreign matter was 0, and the number of defects due to burned deposits was 0.07) per 1 m$^2$, which was a good result.

Water Repellent Treatment Step

Next, 5 parts by mass of a PTFE resin was added based on 95 parts by mass of the porous carbon sheet, and the PTFE resin was heated at 100° C. and dried to give a water-repellent treatment substrate.

Microporous Layer Forming Step

The dispersion liquid for forming the microporous layer was a liquid containing acetylene black as carbonaceous particles, and a PTFE resin dispersion, a surfactant, and purified water as other materials. The compounding ratio of the materials was adjusted to carbonaceous particles/PTFE resin=75 parts by mass/25 parts by mass, and the solid content was adjusted to 22 mass %.

The dispersion liquid was applied to the porous carbon sheet using a die coater, and dried by heating at 120° C. to give a coated sheet. The heated and dried coated sheet was heated at 380° C. to prepare a porous carbon sheet having a microporous layer on one surface. The microporous layer had an average thickness (μm) of 40 μm and an areal weight of 20 g/m². Using the obtained porous carbon sheet having a microporous layer on one surface, power generation performance of the polymer electrolyte fuel cell was evaluated.

The properties of the obtained porous carbon sheet and porous carbon sheet having a microporous layer on one surface are shown in Table 1 together with the properties of the used precursor fiber sheet and the carbonization treatment condition.

Example 2

A porous carbon sheet was obtained in the same manner as in Example 1 except that the short carbon fibers used in the carbon fiber paper sheet were changed to short carbon fibers obtained by cutting the same carbon fibers into a length of 9 mm.

In this porous carbon sheet, the number of defects due to short carbon fiber bundles was 0.95, and the total number of defects due to other appearance defects was 0.17 (the number of defects due to holes was 0.11, the number of defects due to foreign matter was 0, and the number of defects due to burned deposits was 0.06) per 1 m², which was a good result.

Using the obtained porous carbon sheet, a porous carbon sheet having a microporous layer on one surface was obtained through the same water repellent treatment step and microporous layer forming step as in Example 1. Using the obtained porous carbon sheet having a microporous layer on one surface, power generation performance of the polymer electrolyte fuel cell was evaluated.

The properties of the obtained porous carbon sheet and porous carbon sheet having a microporous layer on one surface are shown in Table 1 together with the properties of the used precursor fiber sheet and the carbonization treatment condition.

Example 3

A roll-shaped precursor fiber sheet was obtained in the same manner as in Example 1 except that in the resin impregnation step, the used dispersion liquid was changed to a dispersion liquid prepared by mixing scaly graphite (average particle size: 5 μm), a phenolic resin, and methanol at a mass ratio of 2:8:50, and the resin impregnation amount was changed so that the amount of the phenolic resin would be 170 parts by mass based on 100 parts by mass of the short carbon fibers. A porous carbon sheet having a thickness of 190 μm, an areal weight of 66.6 g/m², and a bulk density of 0.35 g/cm³ was obtained through a heat treatment step and a carbonization step in the same manner as in Example 1 except that two roll-shaped precursor fiber sheets were prepared, and precursor fiber sheets were unwound from the two roll-shaped precursor fiber sheets, superposed on each other, and heat-treated in the subsequent heat treatment step.

In this porous carbon sheet, the number of defects due to short carbon fiber bundles was 0.14, and the total number of defects due to other appearance defects was 0.29 (the number of defects due to holes was 0.23, the number of defects due to foreign matter was 0, and the number of defects due to burned deposits was 0.06) per 1 m², which was a good result.

Using the obtained porous carbon sheet, a porous carbon sheet having a microporous layer on one surface was obtained through the same water repellent treatment step and microporous layer forming step as in Example 1. Using the obtained porous carbon sheet having a microporous layer on one surface, power generation performance of the polymer electrolyte fuel cell was evaluated.

The properties of the obtained porous carbon sheet and porous carbon sheet having a microporous layer on one surface are shown in Table 1 together with the properties of the used precursor fiber sheet and the carbonization treatment condition.

Example 4

A porous carbon sheet was obtained in the same manner as in Example 3 except that the short carbon fibers used in the carbon fiber paper sheet were changed to short carbon fibers obtained by cutting the same carbon fibers into a length of 9 mm.

In this porous carbon sheet, the number of defects due to short carbon fiber bundles was 0.14, and the total number of defects due to other appearance defects was 0.27 (the number of defects due to holes was 0.20, the number of defects due to foreign matter was 0, and the number of defects due to burned deposits was 0.07) per 1 m², which was a good result.

Using the obtained porous carbon sheet, a porous carbon sheet having a microporous layer on one surface was obtained through the same water repellent treatment step and microporous layer forming step as in Example 1. Using the obtained porous carbon sheet having a microporous layer on one surface, power generation performance of the polymer electrolyte fuel cell was evaluated.

The properties of the obtained porous carbon sheet and porous carbon sheet having a microporous layer on one surface are shown in Table 1 together with the properties of the used precursor fiber sheet and the carbonization treatment condition.

Example 5

A porous carbon sheet having a thickness of 190 μm, an areal weight of 85.5 g/m², and a bulk density of 0.45 g/cm³ was obtained in the same manner as in Example 3 except that in the resin impregnation step, the resin impregnation amount was changed so that the amount of the phenolic resin would be 310 parts by mass based on 100 parts by mass of the short carbon fibers.

In this porous carbon sheet, the number of defects due to short carbon fiber bundles was 0.11, and the total number of defects due to other appearance defects was 0.26 (the number of defects due to holes was 0.2, the number of defects due to foreign matter was 0, and the number of defects due to burned deposits was 0.06) per 1 m².

Using the obtained porous carbon sheet, a porous carbon sheet having a microporous layer on one surface was obtained through the same water repellent treatment step and microporous layer forming step as in Example 1. Using the obtained porous carbon sheet having a microporous layer on one surface, power generation performance of the polymer electrolyte fuel cell was evaluated.

The properties of the obtained porous carbon sheet and porous carbon sheet having a microporous layer on one surface are shown in Table 1 together with the properties of the used precursor fiber sheet and the carbonization treatment condition.

Comparative Example 1

A porous carbon sheet was obtained in the same manner as in Example 1 except that the pulp used in the carbon fiber paper sheet was changed to wood pulp, LBKP (bleached kraft pulp) manufactured by Alabama River Pulp Company, Inc.

In this porous carbon sheet, the number of defects due to short carbon fiber bundles was 0.11, and the total number of defects due to other appearance defects was 1.53 (the number of defects due to holes was 1.07, the number of defects due to foreign matter was 0.16, and the number of defects due to burned deposits was 0.30) per 1 $m^2$. Since the ash content in the pulp was high, the total number of defects due to holes, foreign matter, and burned deposits was large.

Using the obtained porous carbon sheet, a porous carbon sheet having a microporous layer on one surface was obtained through the same water repellent treatment step and microporous layer forming step as in Example 1. Using the obtained porous carbon sheet having a microporous layer on one surface, power generation performance of the polymer electrolyte fuel cell was evaluated.

The properties of the obtained porous carbon sheet and porous carbon sheet having a microporous layer on one surface are shown in Table 2 together with the properties of the used precursor fiber sheet and the carbonization treatment condition.

Comparative Example 2

A porous carbon sheet was obtained in the same manner as in Comparative Example 1 except that the short carbon fibers used in the carbon fiber paper sheet were changed to short carbon fibers obtained by cutting the same carbon fibers into a length of 12 mm.

In this porous carbon sheet, the number of defects due to short carbon fiber bundles was 1.64, and the total number of defects due to other appearance defects was 1.45 (the number of defects due to holes was 0.95, the number of defects due to foreign matter was 0.18, and the number of defects due to burned deposits was 0.32) per 1 $m^2$. Since the ash content in the pulp was high, the total number of defects due to holes, foreign matter, and burned deposits was large.

Using the obtained porous carbon sheet, a porous carbon sheet having a microporous layer on one surface was obtained through the same water repellent treatment step and microporous layer forming step as in Example 1. Using the obtained porous carbon sheet having a microporous layer on one surface, power generation performance of the polymer electrolyte fuel cell was evaluated.

The properties of the obtained porous carbon sheet and porous carbon sheet having a microporous layer on one surface are shown in Table 2 together with the properties of the used precursor fiber sheet and the carbonization treatment condition.

Comparative Example 3

A porous carbon sheet was obtained in the same manner as in Example 1 except that the short carbon fibers used in the carbon fiber paper sheet were changed to short carbon fibers obtained by cutting the same carbon fibers into a length of 12 mm.

In this porous carbon sheet, the number of defects due to short carbon fiber bundles was 1.82, and the total number of defects due to other appearance defects was 0.18 (the number of defects due to holes was 0.11, the number of defects due to foreign matter was 0, and the number of defects due to burned deposits was 0.07) per 1 $m^2$. Since the average length of short carbon fibers was as long as 12 mm, the fibers poorly dispersed in the papermaking step and the number of defects due to short carbon fiber bundles was large.

Using the obtained porous carbon sheet, a porous carbon sheet having a microporous layer on one surface was obtained through the same water repellent treatment step and microporous layer forming step as in Example 1. Using the obtained porous carbon sheet having a microporous layer on one surface, power generation performance of the polymer electrolyte fuel cell was evaluated.

The properties of the obtained porous carbon sheet and porous carbon sheet having a microporous layer on one surface are shown in Table 2 together with the properties of the used precursor fiber sheet and the carbonization treatment condition.

Comparative Example 4

A porous carbon sheet was obtained in the same manner as in Example 3 except that the pulp used in the carbon fiber paper sheet was changed to wood pulp, LBKP (bleached kraft pulp) manufactured by Alabama River Pulp Company, Inc., and the short carbon fibers used in the carbon fiber paper sheet were changed to short carbon fibers obtained by cutting the same carbon fibers into a length of 12 mm.

In this porous carbon sheet, the number of defects due to short carbon fiber bundles was 1.80, and the total number of defects due to other appearance defects was 1.11 (the number of defects due to holes was 0.63, the number of defects due to foreign matter was 0.17, and the number of defects due to burned deposits was 0.31) per 1 $m^2$. Since the average length of short carbon fibers was as long as 12 mm, the fibers poorly dispersed in the papermaking step and the number of defects due to short carbon fiber bundles was large. Furthermore, since the ash content in the pulp was high, the total number of defects due to holes, foreign matter, and burned deposits was large.

Using the obtained porous carbon sheet, a porous carbon sheet having a microporous layer on one surface was obtained through the same water repellent treatment step and microporous layer forming step as in Example 1. Using the obtained porous carbon sheet having a microporous layer on one surface, power generation performance of the polymer electrolyte fuel cell was evaluated.

The properties of the obtained porous carbon sheet and porous carbon sheet having a microporous layer on one surface are shown in Table 2 together with the properties of the used precursor fiber sheet and the carbonization treatment condition.

Comparative Example 5

A porous carbon sheet having a thickness of 100 μm, an areal weight of 24 g/$m^2$, and a bulk density of 0.24 g/$cm^3$ was obtained in the same manner as in Example 1 except that the pulp used in the carbon fiber paper sheet was changed to synthetic pulp, polyethylene (PE) pulp SWP EST-8 manufactured by Mitsui Chemicals, Inc., and in the resin impregnation step, the resin impregnation amount was changed so that the amount of the phenolic resin would be 108 parts by mass based on 100 parts by mass of the short carbon fibers.

In this porous carbon sheet, the number of defects due to short carbon fiber bundles was 1.14, and the total number of defects due to other appearance defects was 0.05 (the number of defects due to holes was 0.05, the number of defects due to foreign matter was 0, and the number of defects due to burned deposits was 0) per 1 m². Since the pulp was fibrillated, the short carbon fibers were very poorly dispersed in the papermaking step, and accordingly the number of defects due to short carbon fiber bundles was very large.

Using the obtained porous carbon sheet, a porous carbon sheet having a microporous layer on one surface was obtained through the same water repellent treatment step and microporous layer forming step as in Example 1. Using the obtained porous carbon sheet having a microporous layer on one surface, power generation performance of the polymer electrolyte fuel cell was evaluated.

The properties of the obtained porous carbon sheet and porous carbon sheet having a microporous layer on one surface are shown in Table 2 together with the properties of the used precursor fiber sheet and the carbonization treatment condition.

Comparative Example 6

A porous carbon sheet having a thickness of 100 μm, an areal weight of 24 g/m², and a bulk density of 0.24 g/cm³ was obtained in the same manner as in Comparative Example 5 except that the short carbon fibers used in the carbon fiber paper sheet were changed to short carbon fibers obtained by cutting the same carbon fibers into a length of 12 mm.

In this porous carbon sheet, the number of defects due to short carbon fiber bundles was 2.27, and the total number of defects due to other appearance defects was 0.05 (the number of defects due to holes was 0.05, the number of defects due to foreign matter was 0, and the number of defects due to burned deposits was 0) per 1 m². Since the average length of short carbon fibers was as long as 12 mm and the pulp was fibrillated, the short carbon fibers were very poorly dispersed in the papermaking step, and accordingly the number of defects due to short carbon fiber bundles was very large.

Using the obtained porous carbon sheet, a porous carbon sheet having a microporous layer on one surface was obtained through the same water repellent treatment step and microporous layer forming step as in Example 1. Using the obtained porous carbon sheet having a microporous layer on one surface, power generation performance of the polymer electrolyte fuel cell was evaluated.

The properties of the obtained porous carbon sheet and porous carbon sheet having a microporous layer on one surface are shown in Table 2 together with the properties of the used precursor fiber sheet and the carbonization treatment condition.

Comparative Example 7

A porous carbon sheet having a thickness of 100 μm, an areal weight of 24 g/m², and a bulk density of 0.24 g/cm³ was obtained in the same manner as in Example 1 except that pulp was not mixed in the carbon fiber paper sheet, and in the resin impregnation step, the resin impregnation amount was changed so that the amount of the phenolic resin impregnated into the paper sheet would be 109 parts by mass based on 100 parts by mass of the short carbon fibers.

In this porous carbon sheet, the number of defects due to short carbon fiber bundles was 0.02, and the total number of defects due to other appearance defects was 0.05 (the number of defects due to holes was 0.05, the number of defects due to foreign matter was 0, and the number of defects due to burned deposits was 0) per 1 m², which was a good result.

Using the obtained porous carbon sheet, a porous carbon sheet having a microporous layer on one surface was obtained through the same water repellent treatment step and microporous layer forming step as in Example 1. Using the obtained porous carbon sheet having a microporous layer on one surface, power generation performance of the polymer electrolyte fuel cell was evaluated.

The properties of the obtained porous carbon sheet and porous carbon sheet having a microporous layer on one surface are shown in Table 2 together with the properties of the used precursor fiber sheet and the carbonization treatment condition. As shown in Table 2, when pulp is not mixed, if the bulk density is low, the tensile strength is low and there is concern that the handleability may be deteriorated.

Comparative Example 8

A porous carbon sheet having a thickness of 100 μm, an areal weight of 24 g/m², and a bulk density of 0.24 g/cm³ was obtained in the same manner as in Comparative Example 7 except that the short carbon fibers used in the carbon fiber paper sheet were changed to short carbon fibers obtained by cutting the same carbon fibers into a length of 12 mm.

In this porous carbon sheet, the number of defects due to short carbon fiber bundles was 0.05, and the total number of defects due to other appearance defects was 0.02 (the number of defects due to holes was 0.02, the number of defects due to foreign matter was 0, and the number of defects due to burned deposits was 0) per 1 m², which was a good result.

Using the obtained porous carbon sheet, a porous carbon sheet having a microporous layer on one surface was obtained through the same water repellent treatment step and microporous layer forming step as in Example 1. Using the obtained porous carbon sheet having a microporous layer on one surface, power generation performance of the polymer electrolyte fuel cell was evaluated.

The properties of the obtained porous carbon sheet and porous carbon sheet having a microporous layer on one surface are shown in Table 2 together with the properties of the used precursor fiber sheet and the carbonization treatment condition. As shown in Table 2, when pulp is not mixed, if the bulk density is low, the tensile strength is low and there is concern that the handleability may be deteriorated.

The structures and evaluation results of Examples 1 to 5 are collectively shown in Table 1. The structures and evaluation results of Comparative Examples 1 to 8 are collectively shown in Table 2.

TABLE 1

|  |  | Example 1 | Example 2 | Example 3 | Example 4 | Example 5 |
|---|---|---|---|---|---|---|
| Properties of precursor fiber sheet | Average length of short carbon fibers [mm] | 6 | 9 | 6 | 9 | 6 |
|  | Areal weight of short carbon fibers [g/m$^2$] | 15.7 | 15.7 | 31.4 | 31.4 | 31.4 |
|  | Areal weight of thermosetting resin [g/m$^2$] | 16.3 | 16.3 | 53.4 | 53.4 | 81.4 |
|  | Kind of pulp | LDPT | LDPT | LDPT | LDPT | LDPT |
|  | Amount of pulp [parts by mass] | 50 | 50 | 50 | 50 | 50 |
|  | Ash content in pulp [mass %] | 0.07 | 0.07 | 0.07 | 0.07 | 0.07 |
| Properties of porous carbon sheet | Average thickness (μm) | 100 | 100 | 190 | 190 | 190 |
|  | Bulk density [g/cm$^3$] | 0.24 | 0.24 | 0.35 | 0.35 | 0.45 |
|  | Tensile strength [MPa] | 20 | 20 | 36 | 35 | 44 |
|  | Rate R of bonding carbide [%] | 39 | 39 | 56 | 56 | 66 |
|  | Number of defects due to short carbon fiber bundles [defects/m$^2$] | 0.09 | 0.95 | 0.14 | 0.14 | 0.11 |
|  | Number of defects due to holes [defects/m$^2$] | 0.14 | 0.11 | 0.23 | 0.20 | 0.20 |
|  | Number of defects due to foreign matters [defects/m$^2$] | 0 | 0 | 0 | 0 | 0 |
|  | Number of defects due to burned deposits [defects/m$^2$] | 0.07 | 0.06 | 0.06 | 0.07 | 0.06 |
|  | Total number of defects due to holes, foreign matters, and burned deposits [defects/m$^2$] | 0.21 | 0.17 | 0.29 | 0.27 | 0.26 |
| Properties of porous carbon sheet having microporous layer on one surface | Anti-flooding characteristics Output voltage [V] (Operating temperature 65° C., humidification temperature 70° C., current density 2.2 A/cm$^2$) | 0.39 | 0.38 | 0.32 | 0.33 | 0.25 |
|  | Anti-dry-out characteristics Upper limit temperature [° C.] (Humidification temperature 70° C., current density 1.2 A/cm$^2$) | 90 | 90 | 92 | 92 | 87 |
| Carbonization treatment condition | Maximum temperature [° C.] | 2400 | 2400 | 2400 | 2400 | 2400 |

TABLE 2

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Properties of precursor fiber sheet | Average length of short carbon fibers [mm] | 6 | 12 | 12 | 12 | 6 | 12 | 6 | 12 |
|  | Areal weight of short carbon fibers [g/m] | 15.7 | 15.7 | 15.7 | 31.4 | 15.7 | 15.7 | 15.7 | 15.7 |
|  | Areal weight of thermosetting resin [g/m$^2$] | 16.3 | 16.3 | 16.3 | 53.4 | 16.9 | 16.9 | 17.1 | 17.1 |
|  | Kind of pulp | LBKP | LBKP | LDPT | LBKP | PE | PE | none | none |
|  | Amount of pulp [parts by mass] | 50 | 50 | 50 | 50 | 50 | 50 | 0 | 0 |
|  | Ash content in pulp [mass %] | 0.26 | 0.26 | 0.07 | 0.26 | 0 | 0 | — | — |
| Properties of porous carbon sheet | Average thickness (μm) | 100 | 100 | 100 | 190 | 100 | 100 | 100 | 100 |
|  | Bulk density [g/cm$^3$] | 0.24 | 0.24 | 0.24 | 0.35 | 0.24 | 0.24 | 0.24 | 0.24 |
|  | Tensile strength [MPa] | 18 | 22 | 20 | 38 | 22 | 22 | 11 | 12 |
|  | Rate R of bonding carbide [%] | 39 | 39 | 39 | 55 | 39 | 39 | 39 | 39 |
|  | Number of defects due to short carbon fiber bundles [defects/m$^2$] | 0.11 | 1.64 | 1.82 | 1.80 | 1.14 | 2.27 | 0.02 | 0.05 |
|  | Number of defects due to holes [defects/m$^2$] | 1.07 | 0.95 | 0.11 | 0.63 | 0.05 | 0.05 | 0.05 | 0.02 |
|  | Number of defects due to foreign matter [defects/m$^2$] | 0.16 | 0.18 | 0 | 0.17 | 0 | 0 | 0 | 0 |
|  | Number of defects due to burned deposits [defects/m$^2$] | 0.30 | 0.32 | 0.07 | 0.31 | 0 | 0 | 0 | 0 |

TABLE 2-continued

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| | Total number of defects due to holes, foreign matters, and burned deposits [defects/m$^2$] | 1.53 | 1.45 | 0.18 | 1.11 | 0.05 | 0.05 | 0.02 | 0.02 |
| Properties of porous carbon sheet having microporous layer on one surface | Anti-flooding characteristics Output voltage [V] (Operating temperature 65° C., humidification temperature 70° C., current density 2.2 A/cm$^2$) | 0.38 | 0.39 | 0.39 | 0.31 | 0.30 | 0.30 | 0.39 | 0.38 |
| | Anti-dry-out characteristics Upper limit temperature [° C.] (Humidification temperature 70° C., current density 1.2 A/cm$^2$) | 90 | 90 | 90 | 91 | 89 | 88 | 90 | 90 |
| Carbonization treatment condition | Maximum temperature [° C.] | 2400 | 2400 | 2400 | 2400 | 2400 | 2400 | 2400 | 2400 |

INDUSTRIAL APPLICABILITY

The porous carbon sheet can be applied to various electrode substrates such as electrode substrates of various batteries including a direct methanol fuel cell, and electrode substrates for a dehydrator, as well as a gas diffuser of a polymer electrolyte fuel cell, and is widely applicable.

The invention claimed is:

1. A precursor fiber sheet comprising: short carbon fibers having an average length of 3 to 10 mm, natural pulp having an ash content of 0.03 mass % to 0.10 mass %, and a heat-carbonizable resin, wherein the natural pulp is sulfite pulp, wherein the short carbon fibers and the natural pulp are randomly dispersed in a two-dimensional plane.

2. The precursor fiber sheet according to claim 1, comprising 5 to 100 parts by mass of the natural pulp based on 100 parts by mass of the short carbon fibers.

3. The precursor fiber sheet according to claim 2, wherein the natural pulp is wood pulp.

4. The precursor fiber sheet according to claim 1, wherein the natural pulp is wood pulp.

5. A method of producing a porous carbon sheet comprising: heating the precursor fiber sheet according to claim 1 at a temperature having a maximum temperature of 1300 to 3000° C. to convert the natural pulp and the heat-carbonizable resin into a bonding carbide.

* * * * *